May 28, 1968     P. ZANABONI     3,385,685

APPARATUS FOR CONTINUOUS GLASS SPINNING

Original Filed Nov. 8, 1963

INVENTOR:

Piero Zanaboni

United States Patent Office 3,385,685
Patented May 28, 1968

3,385,685
APPARATUS FOR CONTINUOUS
GLASS SPINNING
Piero Zanaboni, Milan, Italy, assignor to Montecatini Edison S.p.A., Milan, and Vetrocoke S.p.A., Porto Marghera, Venice, Italy
Continuation of application Ser. No. 322,451, Nov. 8, 1963. This application Oct. 17, 1966, Ser. No. 587,341
Claims priority, application Italy, Nov. 13, 1962, 22,370/62
5 Claims. (Cl. 65—12)

ABSTRACT OF THE DISCLOSURE

Apparatus for continuously spinning glass including melting furnace for maintaining glass in molten state, a spinneret communicating with and receiving molten glass from the furnace and having a plurality of outwardly extending nozzle tubes into which the glass flows and tends to solidify, the nozzle tubes having the length L to diameter D ratios of between 1 and 10. The apparatus is also provided with heating means located externally to and spaced from the spinneret for heating the nozzle tubes to a temperature at which the glass in the tubes is maintained in molten state and flows freely through the tubes, and means for continuously drawing off glass filaments formed by the nozzle tubes and, in the event of a filament break, for drawing off a new filament from the respective nozzle tube.

---

The application is a continuation of application, Ser. No. 322,451, filed Nov. 8, 1963, now abandoned.

My invention relates to the spinning of glass into continuous silky filaments.

There are well know processes for spinning glass in continuous silky filaments which are based essentially on obtaining glass filaments by a drawing process employing a rotary drum or other analogous systems, or from glass rods heated to the melting temperature or from a molten glass bath. The filaments that are thus obtained are then wound on a drum and removed at predetermined time intervals or are detached before being completely wound and carried onto a moving support.

In the spinning process in which filaments are drawn from glass rods there is some assurance of continuity in the formation of the silky filament since suitable apparatus is usually provided whose purpose when a filament breaks is to remove the glass drop, which forms at the end of the glass rod and which falls down into the spinning zone pulling a newly forming silky filament behind it, and then to hook the filament following the drop once again to the drawing device automatically. Such a process, however, has some disadvantages which are by no means negligible, such as the discontinuity in the feeding of the glass rods since the rods are manufactured in predetermined finite lengths, so that interruptions, therefore, occur automatically between the spinning of a silky filament from one rod and the next following rod. It is moreover, impossible to use the rods completely since it is necessary to discard a remainder portion thereof before replacing with a new rod. Furthermore, the starting material in such a process constitutes, a prefabricated glass rod which is a manufactured material and is therefore of relatively high cost and appreciably affects the over-all cost of the process.

The known process which is based on drawing silky filaments from a molten bath of glass by means of a series of nozzles in the bottom of the spinneret does have a continuous feeding step; however, it has the disadvantage of being unsuitable for automatic production. In fact, owing to the difficulties of maintaining a constant uniform temperature at the bottom of the spinneret with respect to the nozzles, the silky glass filaments often break. In such a case the nozzles are frequently blocked by the formation of drops at the nozzle outlet and can be unclogged only after the collecting spool has been removed and replaced. During the replacement of the spool, the silky filaments are picked up by hand and the newly spun filaments are reunited to those previously formed to be subjected again to drawing by the cylindrical head of a known drawing device at high speed.

A process has also been proposed which is a combination of the usual process of manufacturing glass rods from a melted bath with a process of spinning silky filaments from prefabricated rods. The molten glass is passed through cold runners to form glass rods under hydraulic thrust produced by the weight of the molten glass bath, and the rods are subsequently advanced into the spinning zone by feed cylinders. This method, however, is quite complicated and does not generally find practical application, particularly owing to the difficulty of keeping a constant temperature in the molten bath and thereby obtaining uniform feeding of all the rods.

It is accordingly an object of my invention to avoid the disadvantages of the aforementioned known processes without reducing the advantages they provide.

An object of my invention is to provide apparatus and process for continuous glass spinning that will assure completely continuous feeding of the material which is to be melted and which can be in the form of glass waste or premelted glass or a vitrifiable composition or mixture, or glass in any other degree of sub-division that is suitable for feeding continuously into a melting furnace.

It is a further object of my invention to provide such apparatus and process that will eliminate the need for prefabricated glass rods, thereby leading to a continuous process which has pronounced economic advantages.

A further object of my invention is to provide such apparatus and process which will insure a completely continuous silky glass filament take-up by removing and discarding the drop which forms at the end of the glass rod upon breakage of the filament and thereafter hooking the filament which forms behind the drop automatically to the drawing device.

To this end, and according to a feature of my invention, there is provided an apparatus which comprises a melting furnace, a spinneret and electrical current resistors, such as high resistance heater coils, the spinneret constituting a metallic base from which cylindrical nozzle tubes extend outwardly and are provided preferably with a countersunk free end, the nozzle dimensions having a length-to-diameter ratio of between 1 and 10. The spinneret is heated by electric current flowing through the resistors, the temperature being set and adjusted at a suitable distance from the spinneret and from the nozzle free ends so as to control the glass drop formation at the ends of the nozzle and at the same time to maintain a uniform temperature over the entire spinneret surface.

Other features which are considered as characteristic for my invention are set forth in the appended claims. The invention, both as to its construction and method of operation, together with additional objects and advantages thereof, will be best understood from the following description of specific embodiments when read in connection with the accompanying drawings, in which:

Figure 1:
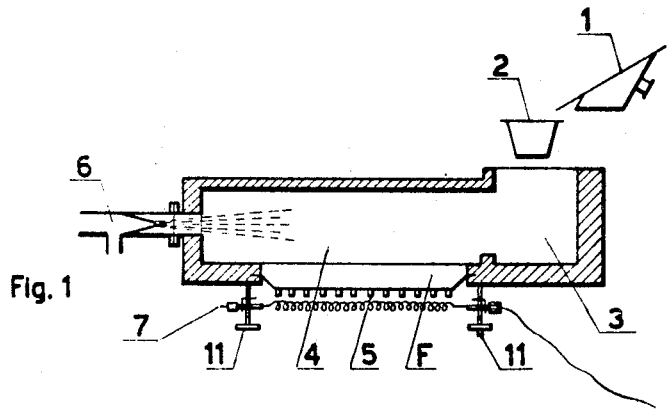
FIG. 1 is a side elevational view partly diagrammatic of the melting and spinning furnace constructed in accordance with my invention.
Figure 2:
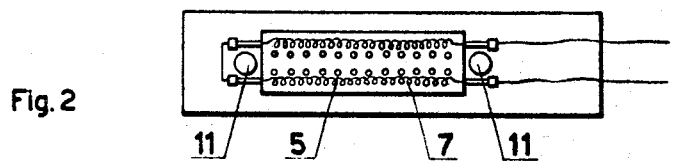
FIG. 2 is a bottom plan view of FIG. 1.

Referring to the drawings and more particularly to FIG. 1, there is shown a device 1 for continuously feeding glass waste, which as diagrammatically represented in this figure consists of a vibrating sloping plate. The waste is fed into a hopper 2 from which it falls into the furnace melting zone 3. Feeding of the wastes from either the vibratory feeder 1 or from the hopper 2 can be effected automatically by a suitable level control device which is responsive to the level of the molten glass in the furnace melting zone 3 such as well known in the art. The furnace which is made of refractory material is heated by burners 6 shown as gas burners in FIG. 1 but which may also be electric burners or other suitable heating means. The furnace is divided into two zones, the aforementioned melting zone 3 and an adjacent spinning zone 4. At the bottom of the spinning-zone chamber 4 is located a spinneret F consisting of a metallic plate having a V-section profile as shown in FIG. 1 but which may also be of rectangular section profile. Nozzle tubes 5 jut outwardly and downwardly from the spinneret plate. The plate F is preferable made of stainless steel, platinum or platinum alloy inasmuch as it must endure high temperatures of generally about 1100° to 1300° C. The plate may also be made of stainless steel or suitable alloy while the nozzle tubes 5 are made of platinum. Thus that portion of the structure which requires precious metal is kept at a minimum and therefore creates no excessive economic burden for its manufacture. The diameter D of the nozzle tubes (FIG. 4) is between 1 and 12 millimeters, preferably between 3 and 7 mm., however it is conceivable that dimensions higher or lower than in these ranges may be employed, the primary consideration being that the corresponding axial length of the nozzle tubes should be such as to provide a length-to-diameter ($L/D$) ratio of between 1 and 10.

Figures 3, 4:
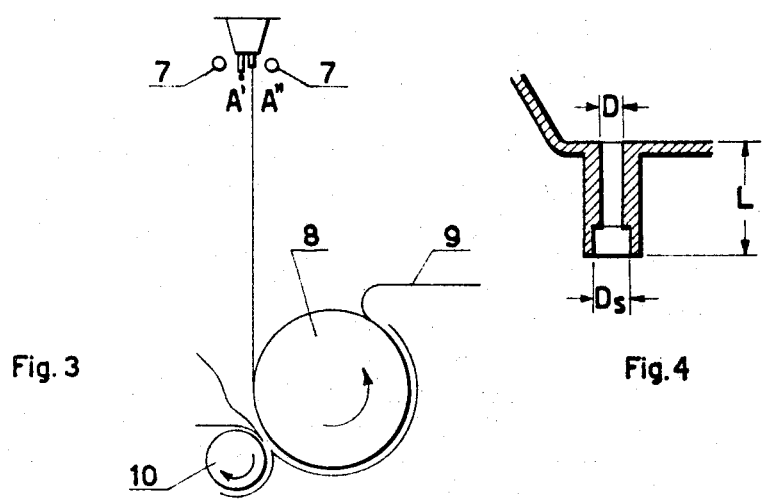
FIG. 3 shows diagrammatically means for continuous take-up of the silky filaments.
FIG. 4 is an enlarged fragment of the apparatus of FIG. 1, showing a spinneret nozzle in greater detail.

The nozzle tubes can be arranged in a single row or in a plurality of rows and can furthermore have a cylindrical cross section with a suitably countersunk free extremity, for example as indicated in FIG. 4. An embodiment constructed in accordance with my invention has a counterbore diameter $Ds$ and an inner nozzle diameter $D$ as shown in FIG. 4 of such dimension as to provide a $Ds/D$ ratio between 1.3 and 1.7. Electric resistors 7 in the form of high-resistant wires or the like are positioned in the regions surrounding the nozzle tubes 5 for increasing the temperature at least up to 1000° C. of the molten glass which reaches the free extremity of the nozzles, the temperature increase being such as to promote unbroken flow of the molten glass downwardly as shown in FIG. 1 and simultaneously to maintain a constant temperature of the entire spinneret surface. The resistors are made of special alloys known in the art which are suitable for enduring high temperatures of 1200–1300° C. The distance between the resistors per se and their position with respect to the spinneret, that is, vertically and horizontally, are adjustable by hand and by means of a simple screw system controlled by hand wheels 11. The hand wheels 11, for example can be provided with a threaded shaft which is advanced into and retracted from a corresponding threaded bore provided in the base wall of the furnace to raise and lower the resistors which are carried by the shaft. The flexible wire resistors can also be bent by hand to bring them closer to or farther apart from each other.

A drawing drum 8 for drawing the silky filaments is shown schematically in FIG. 3 and the filament A″ is conveyed by the schematically shown return device 9 to a collecting or wind-up zone which is not shown. The roller 10 provides means for removing or discarding the drops A′ of glass which form at the free extremity of the nozzles.

In the practice of the invention, glass is melted and maintained in the molten state in the spinning-zone chamber 4 of the refractory furnace. Heat is transferred through the molten bath by conduction so that the glass temperature is stabilized at values which gradually decrease from the top to the bottom of the bath. In the cylindrical nozzle tubes 5, the molten glass has a temperature that is insufficient to cause glass to flow freely downwardly and out of the nozzle. Additional heat is rapidly furnished by passing current through the electrical resistors that are disposed in the region surrounding the nozzle tubes, and the glass in the nozzles quickly reaches the temperature necessary to permit free outflow thereof. The glass first collects in the form of a drop at the nozzle tip and then the drop, falling under the action of gravity, is succeeded by or entrains a silky filament of glass A″. The resistors 7 are used also to adjust the temperature of the metallic plate F thereby assuring uniformity of the temperature along the entire length of the plate. The apparatus constructed in accordance with this invention thus also affords a continuous processs for producing continuous filaments as well as non-continuous filaments and derivatives and manufactured products of the filaments, such as glass veils, mats, rovings, yarns, cloths, ribbons, and the like, in a simple and profitable manner, starting from inexpensive materials such as glass waste or pre-melted glass.

I have found that by using a spinneret constructed in accordance with my invention, it is possible, when a silky glass filament breaks, to form a drop of such dimensions which when falling entrains a new silky filament that can be readily seized automatically by known methods and in any event, without the necessity of employing glass rods that are either prefabricated or formed on location, as is the case for some of the known processes. An important factor in effecting proper operation of my apparatus and process is the value of the nozzle $L/D$ ratio which controls the eventual weight of the glass drop formed at the end of the nozzle tube, this factor being taken into account when employing spinnerets having nozzle tubes of different dimensions. It has been found that with values of $L/D$ ratio that are lower than 1, the molten glass runs out of the nozzle tube continuously without the possibility of a drop formation, while with ratio values higher than 10, the molten mass undergoes cooling which is excessive for proper operating conditions.

A completely continuous process for spinning glass is therefore included in the scope of my invention, in which a melting zone is supplied with glass waste or glass in any subdivided form, the glass being melted and maintained at a suitable temperature as it flows into a spinning zone, heat transfer taking place by conduction through the molten glass, and a temperature increase is effected at the extremities of nozzle tubes into which the molten glass flows from the spinning zone by means of vertically and horizontally adjustable electrical resistors, so as to obtain a freely flowing movement of the molten glass commencing with the formation of a glass drop and followed by a silky filament of glass, the drop entraining and carrying the glass filaments downwardly as it falls under the action of gravity.

While my invention has been illustrated and described as apparatus and process for continuous glass spinning, it is not intended to be limited to the details shown, since various modifications and structural changes may be made without departing in any way from the spirit of my invention. Such adaptations should and are intended to be comprehended within the meaning and range of equivalents of the following claims.

I claim:

1. An apparatus for continuously spinning glass comprising a melting furnace for maintaining glass in molten state; a spinneret communicating with and receiving molten glass from said furnace, said spinneret having a plurality of outwardly extending nozzle tubes into which glass flows and tends to solidify, said nozzle tubes having length L to diameter D ratios of between 1 and 10; heating means located below and spaced from said spinneret for heating said nozzle tubes to a temperature at which the glass in said tubes is maintained in molten state and flows freely through said tubes; and means for continuously drawing off glass filaments formed by said nozzle tubes, said continuous drawing means being adapted, in the event of a filament break, to draw off automatically a new filament from the respective nozzle tube.

2. An apparatus according to claim 1 wherein said heating means is adjustable and heats the entire spinneret to a constant temperature.

3. Apparatus according to claim 1 wherein said nozzle tubes are cylindrical spinning nozzles and have a countersunk free end portion.

4. Apparatus according to claim 3 wherein said nozzles have a main portion formed with a bore of predetermined maximum diameter D, the ratio of the inner diameter $D_s$ of said countersunk portion to the maximum diameter D of said bore being between 1.3 and 1.7.

5. Apparatus according to claim 1 wherein said nozzle tubes have a diameter D of between 1 and 12 mm.

References Cited

UNITED STATES PATENTS 3,082,614   3/1963   Denniston _____ 65—2

DONALL H. SYLVESTER, *Primary Examiner.*

G. R. MYERS, R. L. LINDSAY, *Assistant Examiners.*